United States Patent [19]
Suzuki

[11] 3,788,792
[45] Jan. 29, 1974

[54] APPARATUS FOR FABRICATING SYNTHETIC RESIN ARTICLES BY DOUBLE ROTATION OF A MOLD

[75] Inventor: Tadao Suzuki, Toyohashi, Japan

[73] Assignee: Denki Kaguku Kogyo Kabushiki, Kaisha, Tokyo, Japan

[22] Filed: Mar. 30, 1972

[21] Appl. No.: 239,651

[52] U.S. Cl. ............ 425/429, 425/430, 264/310
[51] Int. Cl. .............................................. B29c 5/04
[58] Field of Search .......... 425/425, 429, 430, 435; 264/310, 311

[56] References Cited
UNITED STATES PATENTS

| | | | |
|---|---|---|---|
| 1,812,242 | 6/1931 | Jensen | 425/430 |
| 3,507,950 | 4/1970 | Barnett et al. | 264/310 |
| 2,629,131 | 2/1953 | Martin et al. | 264/310 X |
| 2,967,329 | 1/1961 | Friedland et al. | 264/310 |
| 3,234,315 | 2/1966 | Blue et al. | 264/310 |
| 3,337,662 | 8/1967 | Spencer | 425/429 X |
| 3,676,037 | 7/1972 | Pivar | 425/435 |

Primary Examiner—Robert L. Spicer, Jr.
Attorney, Agent, or Firm—Flynn & Frishauf

[57] ABSTRACT

An apparatus for fabricating synthetic resin articles by double rotation of molds wherein a plurality of molds are rotatably supported on a frame by rotation shafts for effecting their rotation and the frame is rotatably mounted on a support truck by revolution shafts for effecting the revolution of the frame and consequently the molds. The frame is fitted with drive shafts and there are provided rotation force transmitting devices between the revolution shafts and drive shafts as well as between said drive shafts and rotation shafts. The axial lines of said rotation and revolution shafts perpendicularly intersect each other substantially at the gravitational center of the articles being fabricated in the molds, and double-chain drive means is provided to impart rotation to the revolution shafts and consequently to the rotation shafts via the rotation force transmitting devices, the drive means being disposed at a position external of the truck and outside of the mold heating and cooling sections of the apparatus.

6 Claims, 3 Drawing Figures

APPARATUS FOR FABRICATING SYNTHETIC RESIN ARTICLES BY DOUBLE ROTATION OF A MOLD

This invention relates to an apparatus for fabricating synthetic resin articles by double rotation of molds which carries out the molding of thermoplastic synthetic resin charged in the molds by their rotation and revolution.

The known rotational molding method consisted in charging powders of thermoplastic synthetic resin in a mold and rotating the closed mold under heating to melt and deposit the resin powders on the surface of the mold cavity in uniform thickness, thereby fabricating hollow moldings true to the shape of the mold cavity. The piror art rotational molding method includes mono-rotation system wherein the mold is rotated about a single axis and a double rotation system wherein the mold is rotated about two axes simultaneously. The conventional method was intended to fabricate hollow moldings mainly from powders of synthetic resin. Therefore, attention has heretofore been paid centrifugally to press resin powders against the inner walls of the mold cavity. Since it decreased production efficiency to mold only one article pre-heating cycle, the customary practice was to provide a large number of molds to fabricate numerous moldings at a time. With the conventional double rotational molding system, many juxtaposed molds were simultaneously driven about the axes of rotation and revolution, that is, subjected to the so-called double rotation. Since it was difficult to rotate the molds so as to realize the proper intersection of the axes of rotation and revolution therein, there has heretofore been used that type of rotational molding system wherein the axes of rotation and revolution of the molds did not intersect each other in the molds. Therefore, such system rather resulted in the complicated rotation mechanism, failing to produce moldings of uniform formation free from uneven wall thicknesses.

This invention has been accomplished in view of the aforementioned circumstances and is intended to provide a rotational molding apparatus for molding thermoplastic synthetic resin articles of uniform formation free from uneven wall thicknesses. The apparatus comprises a plurality of molds fitted with shafts for effecting their rotation; a frame for rotatably supporting the molds through said shafts; support stands for rotatably supporting the frame through shafts fitted thereto for effecting the revolution of the molds; drive shafts separately mounted on the frame; and a rotating force transmitting means disposed between the mold revolution shafts and drive shafts as well as between said drive shafts and mold rotation shafts, wherein the axial lines of the rotation and revolution shafts of each mold perpendicularly intersect each other in the mold substantially at the gravitational center of a molding being fabricated therein. To effect efficient molding by the continuous heating and cooling of the molds, the frame bearing the molds is rotatably mounted on a movable truck which is made to travel through the divided sections of its course, that is, a raw material feeding section, mold heating section and mold cooling section; and the molds are continuously heated and cooled while making rotations and revolutions by means of a circulating chain disposed at a prescribed location.

The present invention can be more fully understood from the following detailed description when taken in connection with the accompanying drawings, in which.

Figure 1:
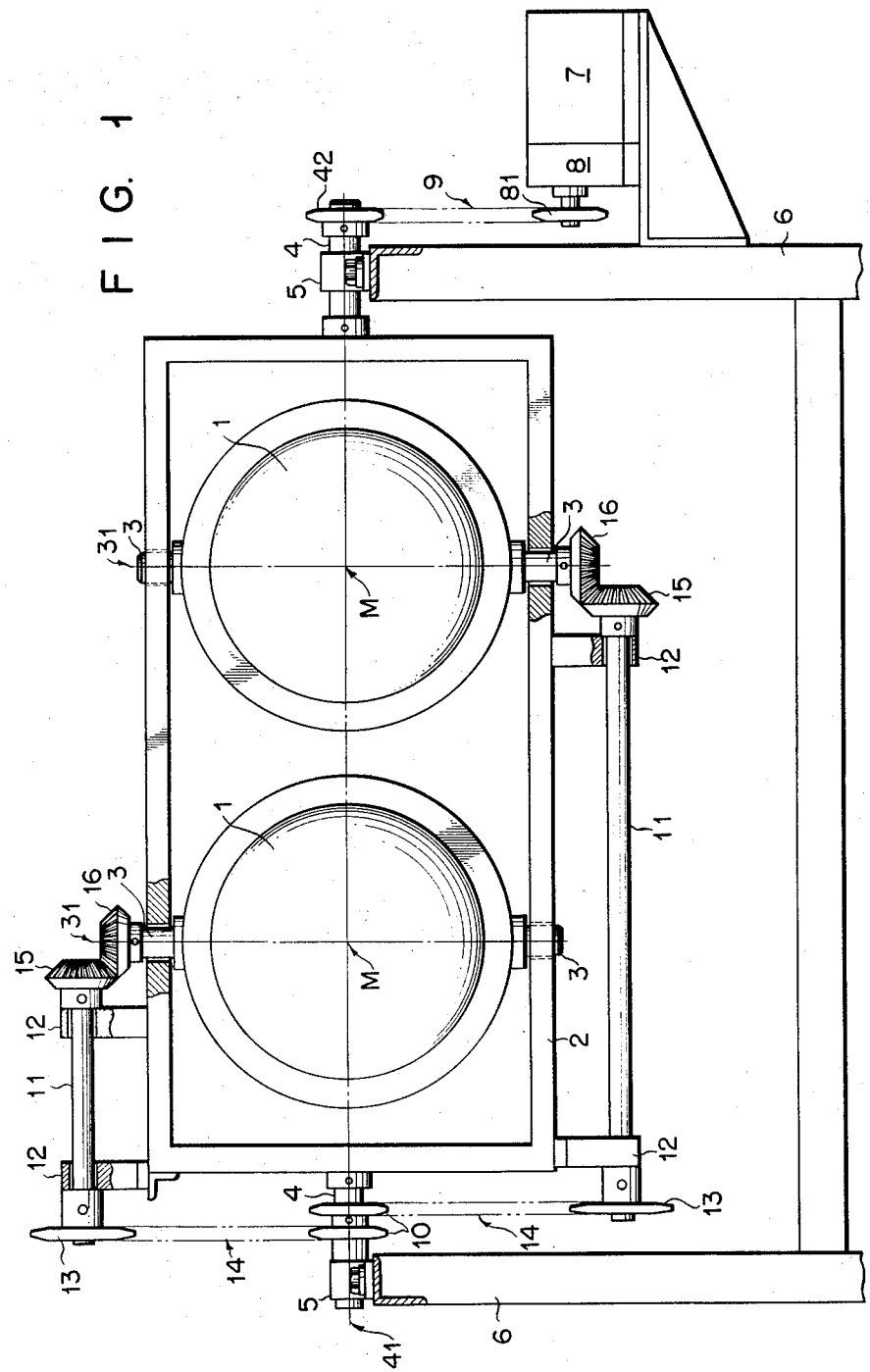
FIG. 1 is a front elevation, partly in section, of a rotational molding apparatus according to an embodiment of this invention.

There will now be described by reference to the appended drawings a rotational molding apparatus according to the preferred embodiments of this invention. Referring to FIG. 1, numeral 1 represents a mold splittable at the center into two parts which jointly define a spherical cavity. FIG. 1 typically illustrates two juxtaposed spherical molds. Numeral 2 shows a rectangular frame, and 3 denotes a pair of shafts projectively fitted at the opposite points of the periphery of each mold 1 so as to effect its rotation, the mold being rotatably fixed to the inside of the frame 2 by said shafts 3. The frame 2 is provided on the opposite sides with a pair of shafts 4 for carrying out the revolution of the molds 1. The mold revolution shafts 4 are so disposed as to have the axial line thereof perpendicularly intersected by that of the mold rotation shafts 3 at a point M substantially conforming with the gravitational center of the spherical molds 1. Numeral 5 shows the bearing sections of the mold revolution shafts 4. The bearing sections 5 are mounted on a pair of support stands 6, causing the frame 2 to be rotatably fitted to said support stands 6 through the mold revolution shafts 4. Numeral 7 is a motor, 8 a speed change gear, and 81 a sprocket fixed to the output shaft of said speed change gear 8. Numeral 42 is a sprocket fitted to one of the mold revolution shafts 4 to be connected to the aforesaid sprocket 81 by a chain 9. Numeral 10 represents sprockets fixed to the bearing section 5 of the other mold revolution shaft 4, and numeral 11 denotes drive shafts rotatably supported by projections 12 formed on the frame 2. Numeral 13 is a sprocket attached to one end of the drive shafts 11, numeral 14 a chain for connecting the sprocket 13 with the sprockets 10, numeral 15 bevel gears fixed to the other end of the drive shafts 11, and numeral 16 bevel gears fitted to the mold rotation shafts 3 for engagement with the former bevel gears 15.

When there is driven the motor 7 described above, then the mold revolution shafts 4 are rotated through the sprocket 81, chain 9 and sprocket 42 in turn, causing the molds 1 to revolve with the frame 2 about an axial line 41. At the same time, the chain 14, sprocket 13, drive shafts 11 and bevel gears 15 and 16 rotate in turn through the sprocket 10 fixed to the bearing section 5, causing the molds 1 to rotate about the axial line 31. That is, the molds 1 are driven by the motor 7 to make rotations about the axial line 31 and revolutions about the axial line 41. When the mold 1 charged with a proper amount of thermoplastic synthetic resin is heated from around while it is rotating and revolving, then the resin is pressed against the walls of the mold cavity by gravitational and centrifugal forces to be melted thereon, forming a spherical molding whose outline exactly conforms with the inner shape of the mold cavity. Immediately after completion of molding, the mold 1 is transferred to the cooling section. After cooling, the mold 1 is opened to take out a desired spherical molding.

Provided it is of thermoplastic type, the synthetic resin used may be in the form of powders or pellets. If the mold 1 is charged with such amount of nonfoamable resin as does not completely fill up the mold cavity, then there will be obtained a hollow molding. In contrast, where foamable resin is used, there will be produced a solid foamed molding.

The rotational molding apparatus of this invention is applicable not only to molds having a spherical cavity, but also to those having many other forms of cavities, thus freely fabricating moldings of other shapes than the spherical. The foregoing description referred to the case where there were prvided two molds. If, however, three or more molds are mounted on a larger frame by fitting an increasing number of bevel gears to the drive shafts 11, then the molding efficiency will be prominently elevated.

According to the aforementioned rotational molding apparatus of this invention, the molds 1 are rotatably fitted to the frame 2 through the shafts 3 for effecting their rotation. The frame 2 is rotatably mounted on the support stands 6 through the mold revolution shafts 4. Accordingly, the molds 1 are made to rotate and revolve about the axial lines 31 and 41 perpendicularly intersecting each other substantially at their gravitational center. Thus the synthetic resin charged in the mold 1 is, when melted, uniformly deposited on the inner walls of the mold cavity by gravitational and centrifugal forces without being unduly accumulated in particular portions of the mold cavity. When, therefore, there is fabricated a hollow molding from nonfoamable resin, the product has a uniform formation free from uneven wall thicknesses.

Further, with the apparatus of this invention, the axial lines 31 and 41 of the rotation and revolution shafts 3 and 4 of the molds 1 perpendicularly intersect each other substantially at the gravitational center of moldings being fabricated in the molds, preventing the frame 2 from being subjected to an abnormal gravitational and centrifugal force resulting from their eccentric rotation which might otherwise occur. Moreover, the apparatus of the invention can have its molds rotated and revolved with a small physical force, thus reducing the power requirement. Though the rotation shaft 3 and revolution shaft 4 of the mold 1 may receive a force acting in the radial direction of the shafts, these shafts 3 and 4 are substantially free during rotation from any centrifugal force that would tend to displace them in the axial direction of their own, thereby permitting the smooth rotation and revolution of the mold 1 due to a construction chiefly based on a radial bearing. Even where, therefore, there is used a large mold, synthetic resin articles can be molded efficiently by a simple mechanical arrangement. When the motor 8 rotates the mold revolution shafts 4, then the drive shafts 11 interlockingly operate the mold rotation shafts 3, so that the rotation and revolution of the mold 1 can be effected by only one motor. The mechanism for interlocking the drive shafts 11 with the rotation and revolution shafts 3 and 4 of the molds 1, and the revolution shafts 4 with the motor 8 is not limited to the drive transmission devices shown in FIG. 1, but may consist of other drive transmission devices, for example, a gear assembly or belt.

If there is used with the molding apparatus of FIG. 1 a mixture of fine and coarse granules of raw synthetic resin, or a mixture of raw synthetic resin particles of different densities, then there can be easily fabricated a molding consisting of two inner and outer layers separated according to the different particle sizes or densities of said raw resins.

Where it was previously desired to produce such two inner and outer layers, the prior art apparatus failed to separate them clearly. In contrast, the apparatus this invention can effect said separation quite distinctly.

Further, the apparatus of the invention can mold a rigid hollow article from nonfoamable synthetic resin in the following manner. Namely, there is separately fabricated a spherical reinforcement body having its periphery bored with numerous apertures larger than the particle size of powders of the aforesaid nonfoamable synthetic resin being later placed therein. The perforated spherical body thus charged is put in a mold. When the mold is fitted to the apparatus of the invention and later subjected to rotation and revolution under heating, then said resin powders contained in the perforated spherical body are forcefully drawn out from the interior thereof through the apertures bored in the periphery by centrifugal and gravitational forces applied to the mold to fill up a space defined between the mold cavity and the outer surface of said spherical body in molten form and tightly deposited on said outer surface. When, therefore, released from the mold, the molding thus fabricated constitutes a rigid hollow article with the core of the spherical reinforcement body fully coated with said nonfoamable resin.

If, in this case, there is used a slightly excess amount of resin powders, part thereof will remain in the spherical reinforcement body to plug its apertures instead of being drawn out therethrough. Accordingly, molten resin coatings on the inner and outer walls of said spherical body are joined together through the apertures thereof, thus producing a more rigid hollow article with said spherical body as a core. Manufacture of such a molding is one of the features of the apparatus of this invention.

Figure 2:
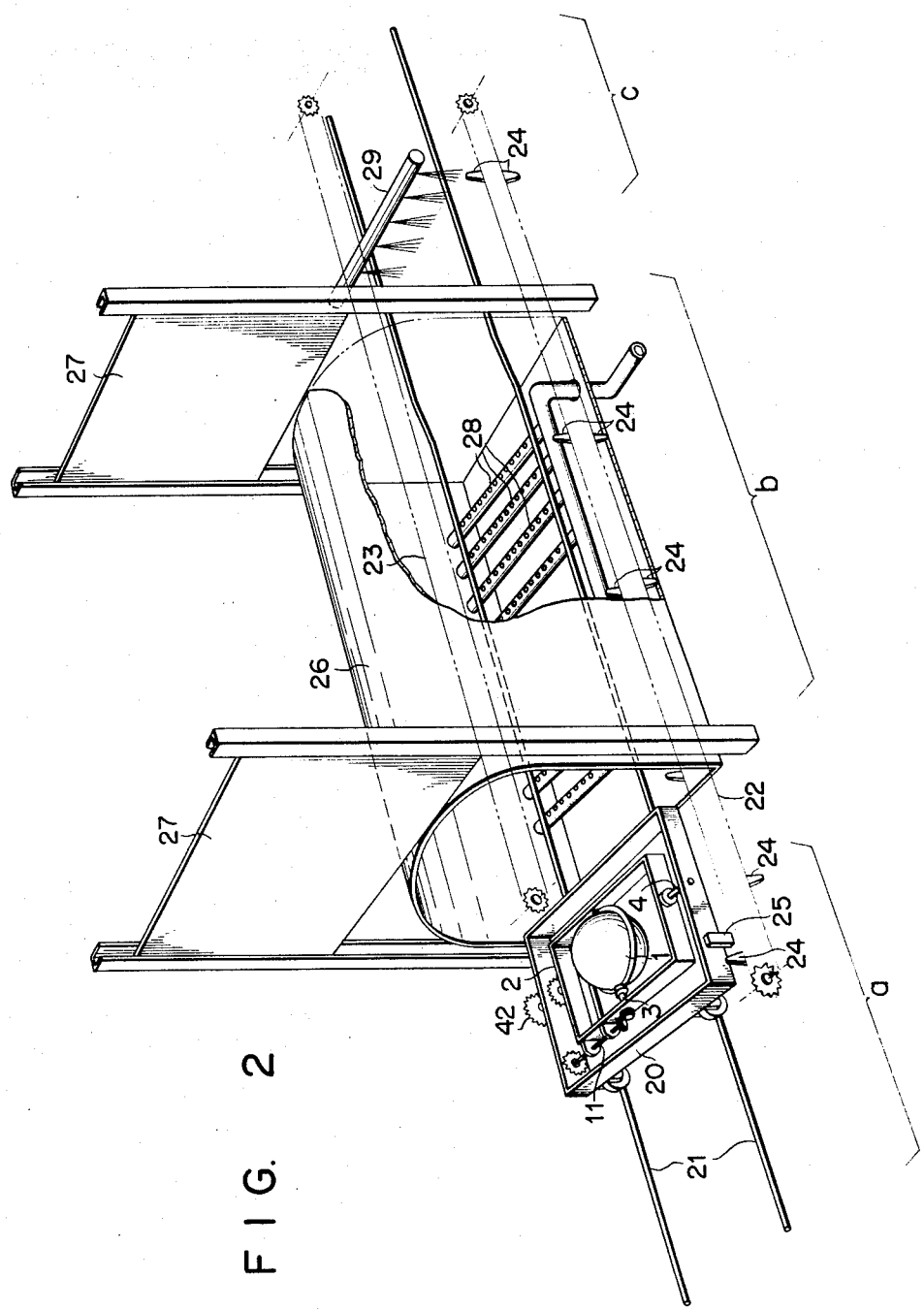
FIG. 2 is a perspective view, partly in section, of a rotational molding apparatus according to another embodiment of the invention.

Referring to FIG. 2, numeral 1 represents a spherical mold splittable at the center into two half portions. Numeral 2 denotes a frame to which the mold 1 is fitted so as to rotate by a pair of mold rotation shafts 3 projectively provided at the opposite points of its periphery. Numeral 20 is a support truck for rotatably supporting the frame 2 through mold revolution shafts 4 fitted thereto. Numeral 21 is a rail track on which the truck 20 travels. The course of the truck 20 along the rail track 21 is divided into three a, b and c sections, that is, a raw material feeding section, mold heating section and mold cooling section. Numerals 22 and 23 are circulating chains. One circulating chain 22 advances the truck 20 bearing the mold 1 through the aforesaid three a, b and c sections in turn. When said truck 20 approaches the heating section b, the other circulating chain drives the sprocket 42 fitted to one side of the truck 20 by having its links engaged with the projections of said sprocket 42, said sprocket 42 being connected to the mold revolution shafts 4. Accordingly, the frame 2 is made to rotate on the truck 20 for the revolution of the mold 1.

Figure 3:
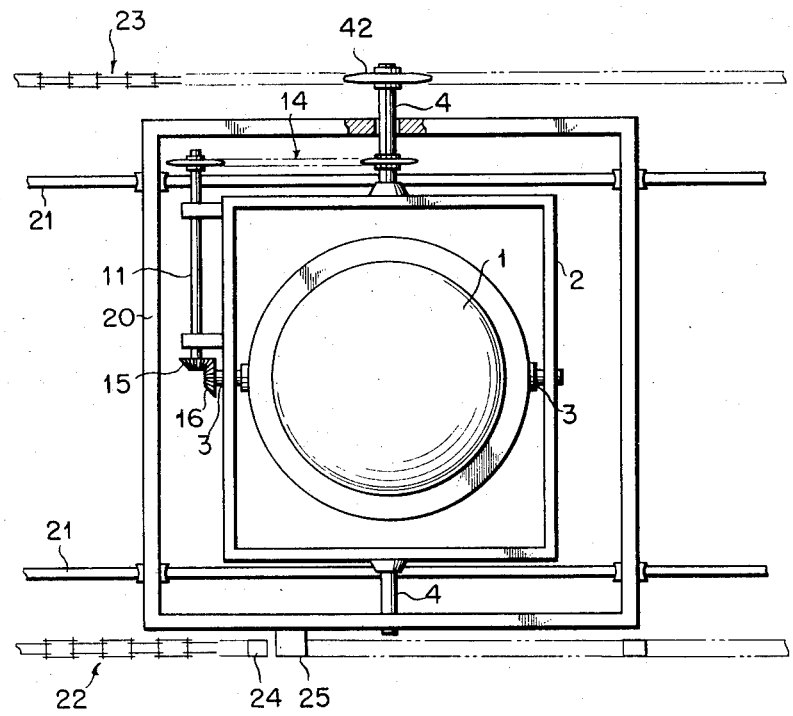
FIG. 3 is a plan view of the apparatus of FIG. 2 with part thereof shown in enlargement.

As illustrated in enlargement in FIG. 3, a chain 14 causes the aforesaid mold revolution shaft 4 to interlock with the drive shaft 11 separately mounted on the frame 2. Said drive shaft 11 is connected to the mold rotation shaft 3 through bevel gears 15 and 16. Therefore, the circulation of the chain 23 eventually leads to the interlocking operation of the drive shaft 11 through the rotation of the aforesaid sprocket 42 and mold revolution shaft 4 resulting from the circulation of the chain 23. Consequently, the mold 1 rotates about its rotaion shaft 3 on the frame 2 through the engagement of the aforementioned bevel gears 15 and 16. Accordingly, the mold 1 travels on the rail track 21 while making rotations and revolutions about its rotation and revolution shafts 3 and 4 whose axial lines perpendicularly intersect each other in the mold 1. At the points on the travelling course of the truck 20 where the sprocket 42 begins to rotate by engagement with the circulating chain 23 and where the sprocket 42 stops its rotation, it is preferred that the rail track 21 be formed of an inclined section so as to allow the sprocket 42 to be easily engaged with or disengaged from the circulating chain 23 according as the truck 20 moves down or up said inclined section.

The truck 20 travels on the rail track 21 by engagement between pawls 24 spatially fixed to the chain 22 and a pawl 25 attached to the opposite side of the truck 20 to that on which there is provided the aforesaid sprocket 42. Further, it is desired that the rail track 21 at those parts of the travelling course of the truck 20, where both pawls 24 and 25 are engaged with or disengaged from each other be formed of an inclined section so as to cause the truck 20 to be easily engaged with or disengaged from the chain 22, according as the truck 20 moves down or up said inclined section.

As apparent from FIG. 2, while the truck 20 carrying the mold stays at the first half part of the raw material feeding section a, neither the truck 20 is made to travel by the chain 22, nor the mold 1 mounted thereon is caused to make any rotation or revolution by the chain 23. At said first half part of the raw material feeding section a, the mold 1 is charged with foamable or nonfoamable synthetic resin in the form of powders or pellets as previously described. Where the resin used consists of pellets, they should preferably be several millimeters or about one centimeter in diameter. When the charging of raw resin is completed, the truck 20 is made to advance to the succeeding heating section b by the chain 22 through the second half part of said feeding section a. When the truck 20 is brough to the heating section b, the sprocket 42 engages the circulating chain 23 to carry out the rotation and revolution of the mold 1. The heating section b has a dome 26 covering its whole and doors 27 provided at both ends. Within the dome 26 is disposed means 28 for heating the mold 1. The mold 1 travels together with the truck 20 by the chain 22 and is heated while making rotations and revolutions. After leaving the heating section b, the truck 20 is transferred to the cooling section c, where the mold 1 is cooled by water ejected from spray 29, while making rotations and revolutions. After the mold 1 is cooled, the truck 20 further travels on the rail track 21 to a place to which the chain 23 of the cooling section c does not extend, thereby stopping the rotation and revolution of the mold 1. When the resin in the mold 1 is fully molded, it is opened to take out the product.

FIGS. 2 and 3 jointly illustrate the case where there is mounted only one mold on the truck 20. However, it is of course possible to provide two or more molds as in FIG. 1. Such arrangement is particularly adapted to elevate the efficiency of producing moldings.

The rotational molding apparatus of this invention shown in FIGS. 2 and 3 causes the mold 1 to travel with the truck 20 while making rotations and revolutions, enabling the mold 1 to be heated and cooled in sequential steps, with the resultant increase in molding efficiency. Further, the rotation and revolution of the mold 1 is effected by a chain which is constructed of nonflammable material such as metal and consequently is prevented from being burnt, though it is exposed to the high temperature of the heating section b, so that said rotation and revolution can always be reliably carried out. The travel of the truck 20 which is carried out also by means of a chain can be smoothly controlled by readily engaging the truck 20 with the chain or disengaging it therefrom by the previously described special device. The chain 23 for effecting the rotation and revolution of the mold 1 and the chain 22 for driving the truck 20 are operated independently of each other, so that their running speed can be freely varied, enabling production of various types of molding having different wall thicknesses and different volumes. Further, at the latter part of the raw material feeding section a, the truck 20 alone is allowed to travel with the mold 1 prevented from making any rotation and revolution, and at the latter part of the cooling section c, the mold 1 alone is allowed to make rotations and revolutions with the travel of the truck 20 stopped, thereby facilitating the charging of raw material and the cooling of the mold 1. In the apparatUs of FIGS. 2 and 3, the axial lines of the rotation and revolution shafts of the mold 1 perpendicularly intersect each other in the mold 1 as in the apparatus of FIG. 1, obviously offering the same prominent advantage as described in connection with the apparatus of FIG. 1.

Where there is no need to vary the running speed of both chains 22 and 23 of FIG. 2, there may be used only one chain instead of two, causing said single chain concurrently to undertake the travel of the truck 20 and the rotation and revolution of the mold 1.

I claim:

1. Apparatus for fabricating synthetic resin articles by double rotation of a mold comprising:
   a mold;
   a generally rectangular frame for rotatably supporting said mold;
   a support truck for rotatably supporting said frame;
   rotation shafts extending from said mold and rotatably coupled to the longer sides of said frame, and revolution shafts extending from the shorter sides of said frame and rotatably coupled to said truck, said rotation and revolution shafts being so arranged as to have their axes intersecting substantially perpendicularly at about the gravitational center of said resin article;
   sprocket means on said truck and drivingly coupled to at least one of said revolution shafts;
   a drive shaft rotatably mounted on, and substantially in parallel with, one of the longer sides of said frame and transmitting rotary motion of said revolution shafts to said rotation shafts through transmission means;
   a rail track for guiding said support truck;

a chain means provided for moving said truck on said track from a raw material feeding section to a mold heating section and a mold cooling section;

a heating device provided in said mold heating section to heat said mold;

another chain means provided at least in said mold heating section for engaging said sprocket when said truck is in said heating section for rotating said revolution and rotation shafts, thereby simultaneously rotating and revolving said mold at least in said mold heating section; and drive means for driving said chains and disposed at a position outside said three sections and external of said truck.

2. Apparatus according to claim 1 including one mold.

3. Apparatus according to claim 1 including a plurality of molds.

4. Apparatus according to claim 3 wherein each of said plurality of molds have rotation shafts extending therefrom, said rotation shafts being rotatably coupled to the longer sides of said frame, said rotation shafts each being so arranged as to have their respective axes intersecting substantially perpendicularly with said revolution shafts at about the gravitational center of said resin article to be formed in the mold, said rotation shafts receiving rotary motion from said revolution shafts via at least one drive shaft mounted on, and substantially in parallel with, a longer side of said frame.

5. Apparatus according to claim 4 wherein the rotation shafts of each of said molds receives rotary motion from respective drive shafts mounted to a longer side of said frame.

6. Apparatus according to claim 1 wherein said transmission means comprises gear means coupled to said drive shaft, and a mating gear means coupled to one of the rotation shafts extending from said mold.

* * * * *